Patented Apr. 7, 1953

2,634,234

UNITED STATES PATENT OFFICE 2,634,234

PRODUCTION OF MONOESTERS OF POLYHYDRIC ALCOHOLS

Noel H. Kuhrt, Rochester, N. Y., assignor, by mesne assignments, to Eastman Kodak Company, Rochester, N. Y., a corporation of New Jersey No Drawing. Application July 16, 1949, Serial No. 105,271

9 Claims. (Cl. 202—52)

This invention relates to methods of separating active catalyst from fatty materials and is particularly concerned with the separation of ester-interchange catalyst in active form from admixture with a fatty acid partial ester of a polyhydric alcohol.

Fatty acid partial esters of polyhydric alcohols are prepared by reacting a polyhydric alcohol fatty ester such as a triglyceride with a polyhydric alcohol such as glycerine in the presence of an ester-interchange catalyst and thereby converting a portion of the fatty ester to partial esters.

Thus, triglycerides are reacted with glycerine in the presence of a suitable ester-interchange catalyst to convert at least a portion of the triglycerides to diglycerides and monoglycerides. The monoglycerides and, to a lesser extent, the diglycerides tend to revert to the more stable triglyceride form, which reversion is greatly accelerated by the presence of the catalyst in active form. Presence of the catalyst also promotes undesirable discoloration of partial ester compositions.

It was found, prior to this invention, that the partial esters could be separated from the reaction mixture by distillation without complete reversion if the catalyst was deactivated before such separation. This method, however, resulted in loss of the catalyst due to inactivation and, furthermore, a substantial reversion of the partial esters occurred during ordinary distillation to form an equilibrium between the triglycerides and the partial esters according to the distillation conditions.

The distillate therefore contained substantial amounts of glycerine released by reversion of the partial ester during distillation even though the excess glycerine from the reaction was removed before distillation. The yield of partial ester was therefore poor and the product was a mixture of partial esters and glycerine.

It is accordingly an object of this invention to provide a method of separating fatty acid partial esters of polyhydric alcohols from ester-interchange catalyst while the catalyst is in active form.

It is a further object of this invention to provide a method of recovering polyhydric alcohol partial esters substantially free of catalyst.

It is another object of the invention to provide a method for separating polyhydric alcohol partial esters from ester-interchange catalyst without substantial reversion of the partial esters during such separation.

Another object of the invention is to recover ester-interchange catalyst in active form suitable for further catalysis.

A further object is to provide economical and efficient procedures for preparing partial esters of high purity.

A still further object is to produce monoglyceride compositions of enhanced quality.

Other objects will be apparent from the description and claims which follow.

These and other objects are attained by means of this invention which comprises vacuum distilling the partial esters from admixture with the catalyst by spreading the composition being treated in a thin film, heating it while in film form to a temperature below the decomposition temperature of the catalyst and subjecting it to vacuum effective at such temperature to rapidly distill partial esters therefrom. In this way, the partial esters are maintained under distillation conditions for but a few seconds or at most a few minutes and no substantial reversion to triglycerides takes place even though the distillation is carried out in the presence of active catalyst. The distillate obtained is free of catalyst and the catalyst remains in the residue in active form suitable for further catalysis. Thus by means of this invention, partial esters are recovered free of catalyst in a single operative step without the loss of catalyst or the necessity of inactivating it.

The esters which may be separated from ester-interchange catalyst by means of this invention include any of the esters prepared by the alcoholysis or esterification of fatty material. The fatty material suitably may be any of the natural or synthetic fatty acid compounds such as fatty acid esters or free fatty acids and including either solid or liquid fats and fatty oils. The fatty acid esters include esters of both polyhydric and monohydric alcohols and mixtures of such esters, and preferably are the esters of fatty acids having from about twelve to about twenty carbon atoms in the fatty acid chain although fatty acids of from about eight to about twenty-six carbon atoms are employed in the preparation of partial esters in accordance with well-known practices.

Suitable fatty materials include marine oils such as fish oils and whale oil, animal fatty materials such as tallow, wool grease, hydrogenated tallow and the various other animal fats and fatty oils, and vegetable oils such as soybean oil, cottonseed oil, cocoanut oil, palm oil, corn oil, olive oil, castor oil, peanut oil and the like, as well as such materials as the hydrogenated vegetable oils or shortenings. Partial esters of particularly good quality for certain uses are prepared from free fatty acids such as stearic acid, oleic acid, lauric acid, palmitic acid, myristic acid and the like.

Alcoholysis or esterification of fatty materials is effected by reacting such fatty materials with an alcohol in the presence of an ester-interchange catalyst. The alcohol employed may be either monohydric or polyhydric; but in the case of use of a monohydric alcohol such as methyl or ethyl alcohol, the fatty material employed should be a fatty acid ester of a polyhydric alcohol, if a polyhydric alcohol partial ester is desired. Alcohols particularly suitable for alcoholysis are the aliphatic alcohols including the aryl-substituted aliphatic alcohols and desirably the lower saturated polyhydric alcohols. Thus suitable alcohols include the polyhydroxy alkanes such as glycerol, sorbitol, mannitol; ether alcohols such as polyglycerols, diglycerol and the like; alkylene glycols such as trimethylene glycol, ethylene glycol, propylene glycol, polyethylene glycols, polypropylene glycols and the like; as well as such other alcohols as pentaerythritol and similar polyhydric alcohols.

The alcoholysis or esterification reaction is carried out in the presence of any suitable ester-interchange catalyst, which may be either an acid or an alkaline catalyst. Particularly suitable catalysts for the preparation of partial esters such as monoglycerides and diglycerides are the metal compounds such as metal oxides and hydroxides which react with fatty acid present in the reaction mixture to form metal soaps serving as ester-interchange catalysts. Suitable monovalent metal compounds include the alkali metal compounds which form metal soaps including sodium hydroxide, sodium methylate, sodium carbonate and the like.

The metal catalysts preferably employed for making partial esters and particularly monoglycerides are the bivalent metal compounds such as strontium oxide, calcium oxide, calcium hydroxide, strontium hydroxide, barium oxide and the like because of the particularly good yields of partial ester and the desirable solubility characteristics of the bivalent metal soaps in the reaction mixture.

The catalysts suitable for use include any of the well-known ester-interchange catalysts which do not distill simultaneously with the desired partial ester and include either organic or inorganic acid catalysts such as alkyl sulfuric acids, aryl sulfuric acids and the like. Other well-known ester-interchange catalysts include tetramethyl ammonium hydroxide, aluminum chloride, boron fluoride which are employed in accordance with well-known alcoholysis practices.

The alcoholysis reaction is preferably carried out with an excess of alcohol over the calculated stoichiometric proportions based on the weight of fatty material being reacted with as much as a 40% excess being desirably employed and as much as 200% excess or more being suitable. The catalyst may be varied as desired, as for example from 0.01 mole to 0.5 mole per equivalent of fatty acid ester. The reaction is generally carried out at temperatures of from about 20° C. to about 400° C. depending upon the materials being reacted. For example, the alcoholysis of soybean oil has been carried out at 180°–200° C. but is more preferably carried out at 250°–260° C. and desirably at 285° C.

It is with the treatment of the composition obtained from such alcoholysis or esterification that this invention is more particularly concerned. The product composition comprises a mixture of the excess alcohol, unreacted fatty material, esters and partial esters, and ester-interchange catalyst in active form.

Prior to this invention it was the practice to inactivate the catalyst before attempting any separation of the other components of the reaction product because the partial esters formed reverted to the more stable completely esterified form and liberated alcohol. The reversion was particularly serious when the excess alcohol, which is normally the most volatile component, was removed first.

By means of this invention, however, partial esters are readily separated from the reaction mixture with the catalyst in active form suitable for use in further esterification or alcoholysis. The reaction mixture freed from partial esters can be re-employed as a portion of a new reaction mixture to which make-up amounts of fresh fatty material and alcohol may be added. Furthermore, by means of this invention, the partial esters are recovered substantially completely without reversion and the partial ester concentrate thus contains a high proportion of partial ester and a low proportion of reversion ester and alcohol.

The separation of active catalyst and partial esters is carried out in accordance with this invention by spreading the alcoholysis reaction mixture in a thin film on an evaporation surface, rapidly heating it while in a thin film to a temperature substantially below the decomposition temperature of the catalyst, and subjecting the heated film to vacuum effective at such temperature to rapidly distill partial ester therefrom, the partial esters being cooled and condensed immediately upon being evolved from the heated film.

The reversion of partial esters such as monoglycerides and diglycerides to triglycerides has been found to be a time reaction; that is, although the reversion will take place at a given elevated temperature, there is a short but finite reversion time interval during which the partial esters may be held at a given temperature before substantial reversion occurs. In the present process, the partial esters are removed from the mixture before the reversion time interval has elapsed so as to obviate substantial reversion of the partial ester.

This is accomplished in accordance with this invention by vacuum distilling the partial esters from a thin film wherein each molecule can readily find its way to the distilling surface and escape from the heated film. The reaction mixture while in a thin film is rapidly heated to distilling temperature without local overheating or heating of certain portions of the mixture for a time sufficient to allow reversion to occur.

The temperature to which the mixture can be heated is limited by the decomposition temperature of the catalyst and is preferably maintained substantially at the distillation temperature of the partial esters at the pressure employed. In the case of the diglycerides and monoglycerides, the distillation temperature is maintained below about 225° C. and preferably below 200° C. With the distillation being effected from a thin film which is flash heated to distilling temperature, the total period during which the mixture is undergoing distillation is usually less than five minutes, and, in the case of distillation on a high vacuum unobstructed path centrifugal still, the distillation period amounts to less than a minute and usually only a few seconds.

The distillation is carried out at a pressure effective to cause distillation of partial esters at the temperature employed. In most cases, it is desirable to employ a vacuum below about 100 microns mercury and preferably below 50 microns, with pressures of the order of 1 to 20 microns or less being desirably employed.

The distillation time in accordance with this invention will necessarily be short when employing elevated temperatures and vacuum effective to cause distillation of the partial esters because, where distillation is effected from a thin film of the order of 5 mm. thickness or less and preferably of the order of 1 mm. or less, the molecules of partial ester are rapidly stripped from the increment of the mixture which is in the form of a film.

Thus, in accordance with this invention successive small portions of the reaction mixture are spread in a film, heated and distilled, and it is not necessary to heat a large body of the mixture as in a pot still and hold all portions of the mixture at elevated temperatures until all the molecules of partial ester can find their way to the distilling surface whereby the reversion time interval would be exceeded and substantial reversion of the order of at least 10% and as much as 50% or more would result therefrom.

An example of a preferred embodiment of the invention is furnished by the separation of monoglycerides formed by alcoholysis of soybean oil from the reaction mixture. Soybean oil is charged into a pot reactor with 2.3 moles of glycerol per mole of oil calculated as triglyceride. To the mixture is added 0.1% by weight of calcium oxide and the mixture is heated at 250–260° C. for 30 minutes. The calcium oxide present reacts with a portion of the fatty acid present forming a metal soap which functions as ester-interchange catalyst. The glycerol and soybean oil interact to form a reaction mixture containing monoglycerides together with diglycerides and triglycerides as ester components in admixture with excess glycerol and ester-interchange catalyst.

This reaction mixture is then treated in accordance with this invention to separate monoglycerides from the catalyst which is still in active form. Successive small portions of the reaction mixture are introduced on the rotor of a high vacuum unobstructed path centrifugal still as by flowing a continuous stream of the mixture onto the rotor. The motion of the rotor causes the mixture to spread outwardly in a thin film. The rotor is heated so that the film is rapidly heated to about 200° C. as it passes across the rotor surface. While in the film, the mixture is subjected to a vacuum of about 5–10 microns mercury causing the unreacted glycerol and the monoglycerides to rapidly distill from the film during the time the mixture passes across the rotor surface. The distillate is condensed on a condensing surface spaced from the rotor evaporator surface. The yield of monoglycerides readily obtained thereby is more than 90% of the monoglyceride present in the original reaction mixture and yields of 95–100% are obtained under optimum conditions. The product is substantially free of catalyst.

In some cases, it may be desirable first to separate unreacted glycerol from the mixture by distillation at a temperature below the distillation temperature of the monoglycerides. This can be effected in the same way without substantial reversion of the monoglycerides because of the short distillation time necessary. In such case, the subsequent monoglyceride distillate is substantially pure and yields of 90–100% are commonly obtained.

The catalyst remains in active form in the residue together with diglycerides, triglycerides, etc., in which the catalyst is soluble and the diglycerides may subsequently be removed as in the case of the monoglycerides by suitably adjusting the temperature and pressure or the entire residue may be reused in another batch.

Similar results are obtained using other fatty materials and other alcohols and catalysts and separating other partial esters such as diglycerides or mixtures of partial esters. The separation is effected in each case by means of this invention without the necessity of inactivating the catalyst. The catalyst may therefore be used again and the unreacted fatty material may also be re-cycled since it is not contaminated by material used to inactivate the catalyst.

The partial esters are obtained substantially free of catalyst and without being contaminated with alcohol liberated by reversion of the esters during separation from the reaction mixture. Improved products as well as substantial operating economies are thus achieved.

The invention has been described in considerable detail with reference to preferred embodiments thereof but it will be understood that variations and modifications therein may be effected within the spirit and scope of the invention as disclosed herein and defined in the appended claims.

What I claim is:

1. The method of treating a composition obtained by reacting a fatty material selected from the group consisting of fatty acids and fatty acid esters with a polyhydric alcohol in the presence of an ester-interchange catalyst to separate partial ester formed during the reaction from said catalyst, which method comprises vacuum distilling said composition while said composition contains said catalyst in active form, said vacuum distilling being effected by spreading said composition in a thin film, maintaining said film at a temperature substantially below the decomposition temperature of said catalyst, and subjecting said film to vacuum effective at said temperature to distill said partial ester from said composition and thereby separating said partial ester from the remainder of said composition containing said catalyst in active form.

2. The method of treating a reaction mixture comprising a fatty acid partial ester of a polyhydric alcohol and an active ester-interchange catalyst employed in forming said partial ester and thereby effecting separation of said partial ester from said active catalyst without substantial reversion of said partial ester, which method comprises flash heating said reaction mixture in a thin film while said mixture contains said catalyst in active form and vacuum distilling fatty acid partial ester of a polyhydric alcohol from said flash heated film at a temperature below the decomposition temperature of said active metal soap catalyst.

3. The method of separating, in active form, a metal soap catalyst employed in the preparation of a fatty acid partial ester of glycerine from a reaction mixture comprising said partial ester and said catalyst in active form, without causing substantial reversion of said partial ester, which method comprises spreading said reaction mixture in a thin film on an evaporating surface, heating said mixture while in said film to a temperature below the decomposition temperature of said catalyst and vacuum distilling said partial ester of glycerine from said heated film containing said active catalyst.

4. The method of separating metal soap catalyst in active form from monoglyceride and recovering said monoglyceride without substantial reversion thereof during said separating, which method comprises subjecting a composition comprising fatty acid esters and partial esters of glycerine including monoglyceride in admixture with metal soap catalyst in active form to high vacuum substantially unobstructed path centrifugal distillation effective to distill monoglyceride from said composition, said distillation being effected by spreading said composition in a thin film on a rotating, heated evaporator surface, heating said composition while in said thin film to a temperature below the decomposition temperature of said catalyst and subjecting said heated composition while in said thin film to vacuum effective at said temperature to distill monoglyceride therefrom.

5. The method of separating active catalyst from monoglycerides present in a composition comprising monoglycerides, an ester-interchange catalyst in active form, and a residual portion of liquid material in which said catalyst is soluble, which method comprises heating successive portions of said composition which contains said catalyst in active form, to a temperature below the decomposition temperature of said catalyst and spreading said successive portions in a thin film permitting rapid distillation of distillate therefrom and subjecting the heated composition while in said thin film to vacuum effective at said temperature to distill monoglycerides away from said catalyst in active form and said residual portion of liquid material, said composition being maintained in said heated condition for a time not substantially longer than the time during which distillation of monoglycerides from said thin film is being effected.

6. The method of treating a composition comprising monoglycerides, ester-interchange catalyst, and a residual portion of liquid material in which said catalyst is soluble, which method comprises spreading successive portions of said composition in a thin film on an evaporator surface while said composition contains said catalyst in active form and vacuum distilling monoglycerides from said film before substantial reversion of said monoglycerides occurs and thereby separating from said composition monoglycerides substantially free of said catalyst, said separating being effected by heating said composition while spreading it in said thin film and subjecting it to reduced pressure effective to distill monoglycerides from the remainder of said composition, said film being heated to a temperature substantially lower than the temperature at which said catalyst decomposes and subjected to a pressure below 100 microns of mercury.

7. The method of recovering monoglyceride free from catalyst from a composition comprising monoglyceride in admixture with an ester-interchange catalyst in active form, which method comprises subjecting said composition, while said composition contains said catalyst in active form, to high vacuum substantially unobstructed path centrifugal distillation at a pressure below 100 microns Hg and a temperature below the decomposition temperature of said catalyst and thereby distilling substantially catalyst-free monoglyceride from said composition without substantial reversion of said monoglyceride.

8. The method of separating monoglyceride, without substantial reversion, from a composition comprising monoglyceride, diglyceride, triglyceride and active ester-interchange catalyst, which method comprises progressively introducing said composition onto an evaporating surface, centrifugally moving said composition across said surface in the form of a thin film, and subjecting said composition, while said composition is moving across said surface, to heating and reduced pressure effective to distill monoglyceride from said composition without substantial reversion of the monoglyceride, said heating being at a temperature substantially below the decomposition temperature of said active catalyst.

9. The method of obtaining a product consisting predominantly of monoglyceride from a mixture of monoglyceride, diglyceride and triglyceride and active ester interchange catalyst without substantial reversion of said monoglyceride which comprises progressively spreading said mixture in a thin film on an evaporating surface, and while said mixture is in said thin film subjecting said film to a pressure below 100 microns Hg and a temperature not higher than 225° C. and thereby vacuum distilling monoglyceride from said mixture without co-distilling substantial amounts of said diglyceride and triglyceride and without substantial reversion of said monoglyceride.

NOEL H. KUHRT.

REFERENCES CITED

The following references are of record in the file of this patent:

UNITED STATES PATENTS

| Number | Name | Date |
|---|---|---|
| 2,383,581 | Arrowsmith et al. | Aug. 28, 1945 |
| 2,496,328 | Bell et al. | Feb. 7, 1950 |